United States Patent
Mück et al.

(10) Patent No.: US 6,169,164 B1
(45) Date of Patent: Jan. 2, 2001

(54) PROCESS FOR PREPARING POLYOXYMETHYLENE MOLDING COMPOSITIONS OF IMPROVED QUALITY

(75) Inventors: Karl-Friedrich Mück, Wiesbaden; Horst Röschert, Ober-Hilbersheim; Joachim Endres, Langen; Juergen Kroll, Weiterstadt; Rainer Hensl, Frankfurt, all of (DE)

(73) Assignee: Ticona GmbH (DE)

( * ) Notice: Under 35 U.S.C. 154(b), the term of this patent shall be extended for 0 days.

(21) Appl. No.: 09/378,368

(22) Filed: Aug. 20, 1999

(30) Foreign Application Priority Data

Aug. 21, 1998 (DE) .............................. 198 38 182

(51) Int. Cl.[7] ...................................... C08F 6/00

(52) U.S. Cl. ............................................. 528/480

(58) Field of Search ............................... 528/480

(56) References Cited

FOREIGN PATENT DOCUMENTS

| | | | |
|---|---|---|---|
| 54-107972 | * | 8/1979 | (JP) . |
| 4-108818 | * | 4/1992 | (JP) . |
| 6-49155 | * | 2/1994 | (JP) . |
| 7-124996 | * | 5/1995 | (JP) . |
| 7-286023 | * | 10/1995 | (JP) . |
| 7-286024 | * | 10/1995 | (JP) . |

* cited by examiner

Primary Examiner—Terressa M. Boykin
(74) Attorney, Agent, or Firm—Connolly Bove Lodge & Hutz LLP

(57) ABSTRACT

A process for the cationically initiated preparation of oxymethylene copolymers in which, after the polymerization and after comminution of the crude polymer in a grinding assembly a portion of the deactivation suspension comprising the ground crude polymer is removed downstream of the grinding assembly and fed back to the process upstream of the grinding assembly. The return procedure predominantly reduces the proportion of oversize while the proportion of undersize rises only insignificantly. The treated crude polymer also has a lower proportion of unstable chain ends.

9 Claims, No Drawings

PROCESS FOR PREPARING POLYOXYMETHYLENE MOLDING COMPOSITIONS OF IMPROVED QUALITY

The present invention relates to a process for preparing polyoxymethylene molding compositions which markedly improves the quality of the molding compositions. This process is significantly simpler than conventional production processes.

Since they were introduced to the market about 30 years ago, polyoxymethylenes (POMs) have become established as extremely useful engineering plastics in a wide variety of applications. POMs are widely used particularly as an engineering plastic in automotive construction and in the electrical industry. Examples can be found in the technical service brochures of POM producers.

Oxymethylene copolymers (POM copolymers) and their preparation are well known and are described, for example, by Sabel in Kunststoff-Handbuch [Plastics Manual], Vol. 3/1, 1992 (Ed. Becker/Braun); which is incorporated herein by way of reference. For example, it is already known that cationic initiators can be used to copolymerize trioxane with cyclic ethers and acetals. The cationic initiators usually used are Lewis acids, such as $BF_3$, strong protic acids, such as $HClO_4$, heteropolyacids or perfluoroalkanesulfonic acids. The comonomers usually used are ethylene oxide or the formals of ethylene glycol, butanediol or diethylene glycol.

In principle, the comonomer content in the POM copolymer can be varied very widely. For example, JP 07-286024 gives a range of from 0.03 to 10 mol % of comonomer units in the polymer for copolymers of oxymethylene and $C_2$–$C_4$-oxyalkylenes modified by long-chain aliphatic end groups. JP 07-124996 gives a general description of a POM copolymer in which the proportion of comonomer in the polymer may be from 3 to 30% by weight.

A comonomer content generally-given for preparing POM copolymers is from 3 to 4% by weight, where these data are to be taken as the proportion by weight of the comonomers in the monomer mixture (examples: JP 07-286023; JP 06-049155; JP 04-108819).

Crude POM copolymers downstream of the polymerization step still contain unstable end groups which prohibit direct use or processing of the polymers. To obtain products stable in processing and over long periods, POM molding compositions are therefore usually subjected to particular treatment steps in which the end groups are stabilized. For example, the crude polymer is treated with aqueous ammonia solution for a prolonged period (JP 54-107972), or is heated in aqueous suspension to 100–200° C. under pressure (NL-A-6812966). The stability achieved here for the molding compositions depends on the content of unstable chain ends in the crude polymer, on the treatment temperature, on the solvent composition of the suspension medium and on the residence time related to the treatment step.

Before the unstable chain ends can be stabilized, the initiator still active in the crude polymer must be deactivated by adding a basic substance. The deactivation usually takes place in suspension. The efficiency of the deactivation here depends on the basic substance used, on the composition of the suspension, on the suspension temperature, on the residence time and on the average particle diameter of the polymer.

In relation to the deactivation care has to be taken that this takes place immediately after the polymerization to prevent chains being broken by the residual initiator, and also that the diffusion paths in the crude polymer are reduced to an optimized value. These two aspects are generally taken into account by grinding the crude polymer in the presence of the deactivator in suspension immediately after the polymerization, using a mill. The deactivation suspension with the ground crude polymer is then separated off from the remainder of the suspension, using a screen, and is passed to a separation assembly, e.g. a centrifuge, in which the ground crude polymer is separated from the deactivation medium. The deactivation medium is then metered back to the mill.

The problem with the process technology of an arrangement of this type is that the screen must have very small holes if a very finely ground crude polymer is to be obtained. However, to ensure the high throughput desired, the open area, i.e. the area of the holes in the screen used, must be very large, and this has an adverse effect on the stability of the product obtained and on the service life of the screen.

If the grinding produces an excessively fine crude polymer, the result can be flotation of the polymer in the suspension medium in other subsequent steps, and this greatly increases the difficulty of handling and conveying the product.

The process to be developed therefore has to be one involving a simple procedure and giving a high service life for the grinding assembly, easy handling of the product and optimized particle size distribution of the polymer, while causing very little cleavage of polymer chains and therefore giving a very stable product.

The object is achieved by, directly upstream of the grinding assembly, feeding back a portion of the deactivation suspension which comprises both the deactivation medium and the crude polymer which has already been ground.

The invention therefore provides a process for the cationically initiated preparation of oxymethylene copolymers, in which the crude polymer produced in a polymerization assembly is fed to a grinding assembly, ground in this grinding assembly in a deactivation suspension comprising a deactivator and a suspension medium, and then fed to other treatment and/or processing steps, which comprises removing, downstream of the grinding assembly, a portion of the deactivation suspension comprising the ground crude polymer and feeding this portion back to the process upstream of the grinding assembly.

Surprisingly, it has been found that the return of the deactivation suspension predominantly reduces the proportion of oversize, i.e. of polymer particles whose average particle size is greater than 1 mm, in the ground product, while the proportion of undersize, i.e. of polymer particles whose average particle size is less than 100 $\mu$m, rises only insignificantly.

Surprisingly, when compared with crude polymer deactivated by conventional processes the crude polymer treated according to the invention also has a lower proportion of unstable chain ends, and this leads to increased stability of the crude polymer. The quality improvement simplifies removal of the residual unstable end groups and is therefore a means of reducing the manufacturing costs for POM.

The novel process essentially provides an improvement in processes generally used to prepare POM copolymers. The polymerization assembly may therefore be any type known for the process. Any other treatment and/or processing method known for the process, for example processes for removing unstable chain ends, addition of additives or of colorants, or of fillers and reinforcing materials, etc., may also follow the deactivation according to the invention.

The composition of the suspension medium for the novel process is also not critical and may vary within wide limits. The main constituent of the suspension medium is usually water or an alcoholic solution. However, any other suspension medium known for the process may also be used.

The deactivator used may comprise any basic substance known for the process. The deactivator is usually fed to the process dissolved in the suspension medium. It is advantageous here for the crude polymer emerging from the polymerization assembly to be treated directly with the deactivator solution, for example by spraying the crude polymer with the solution. However, any other procedure known for the process may also be used.

The references cited at the outset list examples of polymerization, grinding and separating assemblies, treatment methods and processing methods, monomers, comonomers, deactivators, initiators, additives, etc. known for the process, and also a variety of process types and embodiments. According to the invention, the amount of deactivation suspension comprising the ground crude polymer and fed back, i.e. removed downstream of the grinding apparatus and fed back to the process, is from 15 to 60% by weight, preferably from 20 to 40% by weight, particularly preferably from 20 to 30% by weight, of the total deactivation suspension comprising the ground crude polymer and discharging from the grinding assembly via the screen.

The proportion by weight of the suspended crude polymer in the returned deactivation suspension is from 5 to 40% by weight, preferably from 10 to 30% by weight and particularly preferably from 20 to 30% by weight.

Possible grinding assemblies according to the invention are any grinding machinery which is capable of comminuting the crude polymer in the form of a hard solid. Examples which may be mentioned here are hammer mills, cutting mills, fine-product impact mills, etc., and fine-product impact mills are particularly preferred.

The screen plates used to separate off the ground crude polymer may have screens with elongated or round holes. The dimension across the holes here is usually from 2×15 to 4×40 mm for longitudinal holes and from 4 to 20 mm, preferably from 6 to 10 mm, for round holes.

The effect of the novel process is illustrated by the Examples below.

EXAMPLE 1

Trioxane was copolymerized at 80° C. with 3.4% by weight of dioxolane. The polymerization was initiated with 40 ppm of $BF_3$ gas. The residence time under the polymerization conditions in the polymerization reactor was from 3 to 15 minutes. At the reactor exit the crude polymer produced was sprayed with an aqueous triethylamine solution as deactivator solution and fed together with this solution to a fine-product impact mill in which the crude polymer was comminuted. The suspension containing the ground crude polymer was fed to a tank via a round-hole screen with a hole diameter of 5 mm. From this tank 30% by weight of the suspension was returned to the exit of the polymerization reactor and 70% by weight was fed to a centrifuge in which the ground crude polymer was freed from the suspension medium, which was obtained as filtrate. The filtrate obtained was returned to the tank. The content of unstable end groups in the ground crude polymer was determined from the formaldehyde production over 1 hour at 170° C. under alkaline conditions, and the particle size distribution was determined by screen analysis. The results of the investigation are summarized in Table 1.

Comparative Example

As in Example 1, trioxane was copolymerized with dioxolane, and the product- ground and deactivated. Instead of returning a portion of the suspension comprising the ground crude polymer, a corresponding proportion of the filtrate freed from the crude polymer was returned to the exit of the polymerization reactor. The ground crude polymer was separated off as in Example 1, freed from suspension medium and analyzed. The results of the investigation are also summarized in Table 1.

TABLE 1

| | Oversize >1 mm Proportion in [%] | Undersize <100 μm Proportion in [%] | Unstable end groups Proportion* in [%] | Average particle diameter [μm] | Breadth of distribution |
|---|---|---|---|---|---|
| Example 1 | 10.3 | 5.8 | 1.6 | 566 | 1.5 |
| Comparative Example | 12.9 | 4.2 | 2.2 | 625 | 1.7 |

*Proportion = 100% means total degradation of the product

What is claimed is:

1. A process for the cationically initiated preparation of oxymethylene copolymers, in which crude polymer is produced in a polymerization assembly and fed to a grinding assembly, ground in this grinding assembly in a deactivation suspension containing a deactivator and a suspension medium, and then fed to other treatment and/or processing steps, comprising removing, downstream of the grinding assembly, a portion of the deactivation suspension containing the ground crude polymer and feeding this portion back to the process upstream of the grinding assembly.

2. The process as claimed in claim 1, wherein, immediately after leaving the polymerization assembly, the crude polymer is sprayed with a solution comprising the deactivator and the suspension medium.

3. The process as claimed in claim 1, wherein said portion of the deactivation suspension containing the ground crude polymer that is removed downstream of the grinding assembly and fed back to the process upstream of the grinding assembly is of from 15 to 60% by weight of the deactivation suspension downstream of the grinding assembly.

4. The process as claimed in claim 3, wherein said portion is of from 20 to 40% by weight of the deactivation suspension downstream of the grinding assembly.

5. The process as claimed in claim 1, wherein the suspension medium is water or an alcoholic solution.

6. The process as claimed in claim 1, wherein said proportion of the crude polymer in said portion of the deactivation suspension that is removed downstream of the grinding assembly and fed back to the process upstream of the grinding assembly is of from 5 to 40% by weight.

7. The process as claimed in claim 6, wherein said proportion of the crude polymer is of from 10 to 30% by weight.

8. The process as claimed in claim 1, wherein the grinding assembly employed is a hammer mill, cutting mill or fine-product impact mill.

9. The process as claimed in claim 1, wherein the crude polymer deactivated, ground and then fed to other treatment and/or processing steps has an average particle size of from 400 to 600 μm.

* * * * *